United States Patent
Dupont et al.

(10) Patent No.: US 10,977,315 B2
(45) Date of Patent: Apr. 13, 2021

(54) SYSTEM AND METHOD FOR STATISTICS-BASED PATTERN SEARCHING OF COMPRESSED DATA AND ENCRYPTED DATA

(71) Applicant: Cyborg Inc., New York, NY (US)

(72) Inventors: Nicolas Thomas Mathieu Dupont, New York, NY (US); Alexandre Helle, New York, NY (US); Glenn Lawrence Cash, Matawan, NJ (US)

(73) Assignee: Cyborg Inc., New York, NY (US)

( * ) Notice: Subject to any disclaimer, the term of this patent is extended or adjusted under 35 U.S.C. 154(b) by 0 days.

(21) Appl. No.: 16/806,338

(22) Filed: Mar. 2, 2020

(65) Prior Publication Data
US 2020/0279003 A1 Sep. 3, 2020

Related U.S. Application Data

(60) Provisional application No. 62/962,492, filed on Jan. 17, 2020, provisional application No. 62/819,206, (Continued)

(51) Int. Cl.
*G06F 16/903* (2019.01)
*G06F 16/953* (2019.01)
(Continued)

(52) U.S. Cl.
CPC .... *G06F 16/90344* (2019.01); *G06F 16/1744* (2019.01); *G06F 16/9014* (2019.01); *G06F 16/953* (2019.01)

(58) Field of Classification Search
CPC ............ G06F 16/1744; G06F 16/9014; G06F 16/90344; G06F 16/953
See application file for complete search history.

(56) References Cited

U.S. PATENT DOCUMENTS

| 5,737,733 A | * | 4/1998 | Eller | ...................... | H03M 7/30 707/708 |
| 6,865,577 B1 | * | 3/2005 | Sereda | ................ | G06F 16/2255 707/699 |

(Continued)

OTHER PUBLICATIONS

International Search Report for International Application No. PCT/US2020/020652, dated May 28, 2020, 3 pages.
(Continued)

*Primary Examiner* — Richard L Bowen
(74) *Attorney, Agent, or Firm* — Cooley LLP

(57) ABSTRACT

A method for searching compressed, encrypted data includes receiving uncompressed data and identifying patterns thereof. Each pattern includes a predetermined number of bytes. Each pattern is hashed into a hash value, producing a set of hash values that is stored in a hash table. Each record of the hash table includes a hash value from the set of hash values and an associated position value. A Boolean filter is generated based on the hash table, each bit of the Boolean filter associated with a different hash value. A search string hash value is calculated based on a received search request. A location in the Boolean filter, having an address equal to the search string hash value, is inspected to determine whether a position stored at the location is true or false. If the position is true, at least a portion of the compressed data is flagged as relevant.

20 Claims, 10 Drawing Sheets

Related U.S. Application Data filed on Mar. 15, 2019, provisional application No. 62/812,397, filed on Mar. 1, 2019.

(51) Int. Cl.
 *G06F 16/901* (2019.01)
 *G06F 16/174* (2019.01)

(56) References Cited

U.S. PATENT DOCUMENTS

| | | | |
|---|---|---|---|
| 7,689,547 B2 | 3/2010 | Cristofor et al. | |
| 9,473,168 B1* | 10/2016 | Gopal | H03M 7/3082 |
| 9,825,648 B1* | 11/2017 | Gopal | H03M 7/3086 |
| 9,843,702 B1 | 12/2017 | Wallace et al. | |
| 2012/0117080 A1* | 5/2012 | Lamanna | G06F 16/31 |
| | | | 707/747 |
| 2016/0248655 A1* | 8/2016 | Francisco | H04L 43/028 |
| 2017/0034285 A1* | 2/2017 | Bhandari | H04L 67/16 |
| 2017/0220696 A1* | 8/2017 | Zhang | G06F 16/90344 |
| 2018/0152201 A1* | 5/2018 | Gopal | G06F 9/5038 |
| 2019/0095490 A1* | 3/2019 | Colgrove | G06F 16/2455 |
| 2019/0251189 A1* | 8/2019 | VanderSpek | G06F 16/1756 |

OTHER PUBLICATIONS

Written Opinion for International Application No. PCT/US2020/020652, dated May 28, 2020, 6 pages.

\* cited by examiner a b c d e f g h i j k l
———————————— keyword

Hash #1  [a b c d e f]
Hash #2  [b c d e f g]
Hash #3  [c d e f g h]
Hash #4  [d e f g h i]
Hash #5  [e f g h i j]
Hash #6  [f g h i j k]
Hash #7  [g h i j k l]

FIG. 3B a b c d e f g h i j — keyword

Hash #1  [a b c d]
Hash #2  [b c d e]
Hash #3  [c d e f]
Hash #4  [d e f g]
Hash #5  [e f g h]
Hash #6  [f g h i]
Hash #7  [g h i j]

FIG. 7

SYSTEM AND METHOD FOR STATISTICS-BASED PATTERN SEARCHING OF COMPRESSED DATA AND ENCRYPTED DATA

CROSS-REFERENCE TO RELATED APPLICATIONS

This application claims priority to and the benefit of U.S. Provisional Patent Application No. 62/812,397, filed Mar. 1, 2019 and titled "System and Method for Statistics-Based Keyword Searching of Compressed Data"; U.S. Provisional Patent Application No. 62/819,206, filed Mar. 15, 2019 and titled "System and Method for Statistics-Based Keyword Searching of Compressed Data"; and U.S. Provisional Patent Application No. 62/962,492, filed Jan. 17, 2020 and titled "System and Method for Statistics-Based Pattern Searching of Compressed. Data and Encrypted Data;" the contents of each of which are incorporated by reference in their entireties, for all purposes.

FIELD

The present disclosure relates to systems and methods for searching compressed data, for example to identify compressed files relevant to a search term. This process is applicable to compressed data as well as encrypted data.

BACKGROUND

The process of reducing the size of a data file is often referred to as data compression. Data compression involves encoding information using fewer bits than the original representation, and can be lossless or lossy. Encrypted data is data that has been translated, through encryption, into a form different from its original form, such that a decryption key is required to access the data in its original form.

SUMMARY

In come embodiments, a system and method for performing a pattern search within a single compressed data file or a collection of compressed data files, without prior decompression of the compressed data files, are described. In some embodiments, a pattern-based search of a single compressed data file or multiple compressed data files is performed by hashing the pattern, determining an associated hash value, and analyzing a single bit of each of the compressed data files based on the hash value. In other embodiments, a pattern-based search of a single compressed data file or multiple compressed data files is performed by hashing the pattern, determining multiple associated hash values, and analyzing the respective bits of each of the compressed data file(s) based on the hash values.

In some embodiments, a method for searching compressed and/or encrypted data includes receiving an uncompressed data file at a processor. Multiple patterns of the uncompressed data file (optionally including overlapping patterns) are identified, via the processor. Each pattern from the multiple patterns includes a predetermined number of bytes (e.g., 4 bytes). Each pattern from the multiple patterns is hashed, via the processor, into a hash value (e.g., a two-byte hash value), to produce multiple hash values. The multiple hash values are stored in a hash table. Each record from multiple records of the hash table includes a hash value from the multiple hash values and an associated position value. A Boolean filter (also referred to herein as a "hash filter") is generated, via the processor, based on the hash table. Each bit from multiple bits of the Boolean filter (e.g., including 65,536 bits) is associated with a different hash value from the multiple hash values. A search request, including a search string, is received at the processor, and a search string hash value is calculated based on the search string. If a position stored at a location within the Boolean filter, the location having an address equal to the search string hash value, is true, the processor generates a flag indicating that at least a portion of the compressed, encrypted data is relevant to the search request. The computing the search string hash value can include computing overlapping hashes based on a minimum match size value.

In some embodiments, a method for searching compressed and/or encrypted data includes receiving, at a processor, a search request including a search string. A search string hash value is generated based on the search string, and a hash table position of a hash table is detected based on the search string hash value. If a value of a bit of an Nth compressed data file, the bit having a value corresponding to the hash table position, is true, the Nth compressed data file is flagged as relevant to the search request, and a signal representing the Nth compressed data file is transmitted to a compute device of a requestor associated with the search request. If the value of the bit is not true, the processor determines whether at least one additional compressed data file exists. If at least one additional compressed data file exists, the at least one additional compressed data file is inspected to determine whether the at least one additional compressed data file is relevant to the search request.

In some embodiments, a system for searching compressed and/or encrypted data includes a processor and a processor-readable memory storing instructions that, when executed by the processor, cause the processor to execute operations, including receiving an uncompressed data file and identifying patterns of the uncompressed data file, each pattern including a predetermined number of bytes (e.g., 4 bytes). The operations also include hashing each of the patterns into a hash value (e.g., a two-byte hash value), to produce a set of multiple hash values. The operations also include storing the hash values in a hash table, each record of the hash table including one of the hash values and an associated position value, to produce a compressed, encrypted data file associated with the uncompressed data file. The operations also include generating a Boolean filter based on the hash table, each bit of the Boolean filter associated with a different hash value from the plurality of hash values. The operations also include receiving a search request including a search string, and computing a search string hash value based on the search string. The operations also include flagging that at least a portion of the compressed data file is relevant to the search request if a location within the Boolean filter, the location having an address equal to the search string hash value, is true.

Example features, structure and operation of various embodiments are described in detail below with reference to the accompanying drawings.

BRIEF DESCRIPTION OF THE DRAWINGS

FIG. 3B is a diagram illustrating an example generation of multiple overlapping hashes of a pattern, according to some embodiments.

FIG. 7 is a diagram illustrating an example of multiple overlapping hashes of a keyword, according to some embodiments.

DETAILED DESCRIPTION

Figure 1:
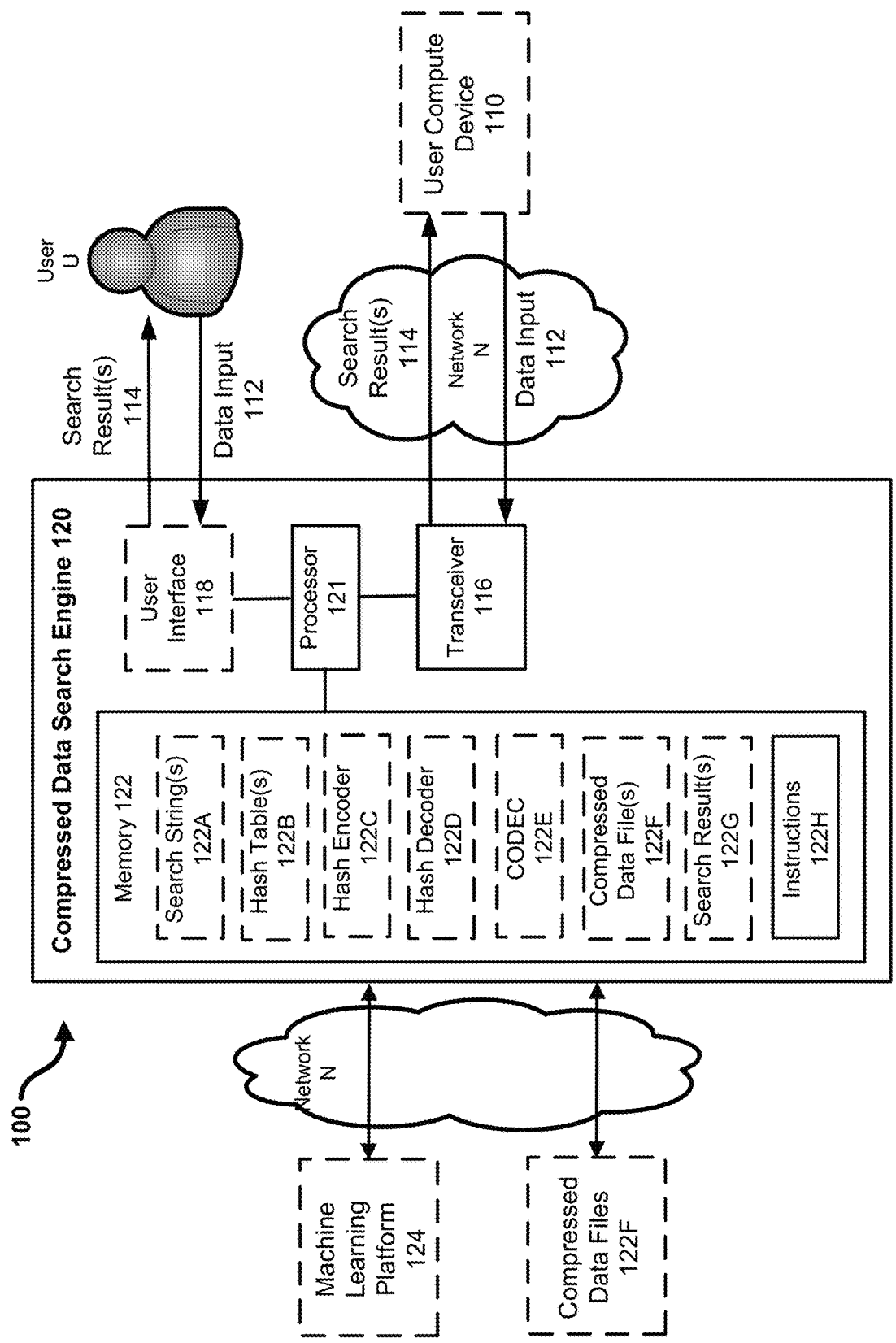
FIG. 1 is a system block diagram for a compressed data search engine, according to some embodiments.

Known file systems, such as the Windows Explorer file system, can be searched based on indexed data associated with the files, such as filenames, file locations and/or file metadata. Searching of content within the files, however, can typically only be performed on uncompressed, "searchable" files. In other words, if the files being searched are compressed (e.g., zip files), their internal contents cannot be keyword searched by the file system. Some known tools (e.g., zgrep) exist to perform searches on compressed data; such tools, however, typically perform sequential decompressions of "chunks" prior to performing the search, and thus can be computationally expensive.

Embodiments of the present disclosure facilitate the searching of a compressed data file, or a set of multiple compressed data files (i.e., a file system), based on a search string (e.g., a pattern or other search criteria), using compression-related statistics (and/or decompression-related statistics) such as hash table data, variable-length codeword frequencies, or compression/decompression dictionary. The compression-related statistics and/or decompression-related statistics can be stored in an uncompressed format and remain in an uncompressed format during searching, whereas the compressed data files remain compressed during searching. Additionally, the compression-related and/or decompression-related statistics can be compacted and/or compressed using existing techniques (e.g., Huffman encoding, run-length encoding, etc.). In some embodiments, the pattern is a keyword. In some embodiments, a pattern-based search of multiple compressed data files is performed by hashing the pattern into a hash value, determining/detecting/identifying a hash position associated with the hash value, and based on the identified hash position, analyzing a single bit of all of, or of at least one of, the compressed data files (or chunks/subsets thereof) to determine whether each single bit is a "1" (i.e., a potential or actual positive search result) or a "0" (i.e., a negative search result). Within the context of the search, when the analyzed bit is a "1," the associated compressed data file can be deemed a "match." The analyzing of a single bit of some or all compressed data files can be performed, for example, until all matches within the file system are identified/detected, or until a single matched compressed data file is identified/detected. A search can be defined as fully exhaustive or partial, for example by setting (e.g., in response to a user input) a rule or instruction.

In some embodiments, the compression-related statistics are a collection of Boolean-type (true/false) values associated with a hash table (e.g., an encoder hash table). A hash table is a collection of all potential hash values (e.g., hashes of patterns occurring within a given data) and positions within an input buffer to facilitate parsing and compression of the data contained within said input buffer. Should a hash table entry/record, within the hash table and for a specific hash value, contain a position (e.g., the record associated with the specific hash value contains a non-zero value for a position or location field), then the given hash value has occurred within the input buffer. If the hash table entry/record, within the hash table and for the same specific hash value, does not contain a position, then it must not have occurred within the input buffer. It is possible to use these relationships between position data and prior occurrence of the hash values to build a "hash filter" (also referred to herein as a "stealth hash filter") or a collection of Boolean values for every possible hash value for a given hash table. The hash filter can be stored, for example, in the form of an array or a table (e.g., a long true/false table). If the $N^{th}$ hash value has occurred, then a "true" value, or '1', is assigned to the $N^{th}$ bit of the hash filter. If the $N^{th}$ has value has not occurred, then a "false" value, or '0', is assigned to the $N^{th}$ bit of the hash filter. When a pattern-based search is to be completed on a compressed data, then the pattern is hashed and the respective hash filter bit is checked. In some such implementations, a hash value of N indicates that the Nth bit in the hash filter should be checked (i.e., detection of the hash value of N can trigger a check of the Nth bit in the hash filter). In other words, if the hash function yields hash values between 0 and 65,535, then the hash filter would contain 65,536 bits. A given hash value can then be used as an index within the hash filter, indicating which bit should be checked. In some embodiments, should the hash filter bit be true, or '1', then the compressed data is likely to contain the searched pattern. Should the hash filter bit be false, or '0', then the compressed data does not contain the searched pattern.

There can be limitations to the embodiment described above. Specifically, since multiple patterns can produce the same hash value, there is a chance that a positive result in should fact be negative, in which case the positive result can be considered a "false positive." The chance of a false positive occurring, or the false positive rate, is directly correlated to the entropy of the hash filter. In other words, if the hash filter is 50% full, there is a 50% chance of randomly finding a true, or '1' bit, and therefore there is a 50% chance that a positive result is in fact a false positive. This can severely decrease the accuracy of the search, sometimes to the point of rendering its results unusable. To mitigate this, the process of "overlapping hashing" can be employed. This process includes hashing multiple substrings of the searched pattern. For instance, if the pattern is 6 bytes long, then bytes [0 3] can be hashed, in addition to each of bytes [1-4], [2-5] and [3-6]. This produces four hash values, which can be correlated to four hash filter positions. For the search to be truly positive, then each of the bits in the given hash filter positions should return a true value, or '1'. If any of the bits return a false value, or '0', then the search is negative, in other words, an 'AND' operation is computed on the given hash filter positions, whereby a successful 'AND' comprises every position returning a true value, or '1'. Using the aforementioned example, if the chance of a single bit being true is 50%, then the chance of four bits returning true is (50%×50%×50%×50%), or 6.25%. This significantly increases the accuracy of the search, and can be scaled to much larger patterns, and therefore much lower false positive rates. This behavior can be described as $f=h^p$, where f denotes the false positive rate, h denotes the hash filter entropy, and p denotes the number of hash filter positions checked.

By considering only compressed data files having a bit that matches the hash table position, search processes set forth herein can isolate a subset of the multiple compressed data files (or chunks/subsets thereof) that are statistically significantly likely to have an instance of that pattern in them, without indexing the content of the compressed data files (or chunks/subsets thereof) beforehand. In some embodiments, the compressed data files described herein represent alphanumerical characters only (i.e., the ASCII character set). Systems and methods set forth herein accomplish searching of compressed data with increased computational efficiency and speed, as compared with known approaches, and without the initial/prior decompression of and/or prior indexing of the compressed data.

Alternatively to compressed data, the processes set forth herein can be applied to encrypted data.

Compressed files and encrypted files are similar to one another in the way that they remove patterns in data, making the compressed data or encrypted data opaque and unreadable. Using some known search techniques to determine whether a pattern or sequence of bytes occurs in such files, the files are first fully decompressed and/or decrypted, which can cause slowdown and makes the data susceptible to a security breach. For example, similar to known methods for searching compressed data (which require sequential decompressions of "chunks" of the compressed data prior to performing the search), some known methods for searching encrypted data involve prior, recursive decryption before a search can be completed. By compressing data into a compressed data and a hash filter, and encrypting the compressed data into an encrypted compressed data, according to methods set forth herein, the hash filter can be used to perform a search of the encrypted compressed data without a preceding decryption or decompression step. Such search capabilities can be referred to as a "stealth searchable mode," or "stealth search method." Stealth search methods leverage a first modeling pass architecture in which fixed-size byte sequences are hashed and their positions are stored in a hash table, thereby creating a filter (or "stealth hash filter"), as discussed further below.

Known methods exist for determining, to a varying degree of accuracy, whether an element is present within a set of elements. Such methods are collectively known as Approximate Membership Query data structures (AMQ), and can include quotient filters, skip lists, Bloom filters, and/or count-min sketches. It is believed that such methods have not been implemented for determining whether a pattern occurs within a compressed data file, for example because AMQ data structures are typically constructed using extensive building procedures, such as hashing and parsing, which are time-consuming and computational resource intensive (i.e., costly in terms of processing power). By contrast, since one or more embodiments of the present disclosure use statistics generated during compression, no additional building steps are needed, apart from the concatenation of those statistics to the compressed data file. Further, AMQ data structures solely permit the evaluation of set membership for a single "element," which may be a word, key, or other discrete item. This can prove problematic with compressed data, since partial matches would not be flagged as a match in such a scenario. One or more embodiments of the present disclosure address this issue through the use of byte-wise hashing, rather than element-based evaluation.

FIG. 1 is a system block diagram for a compressed-data search engine, according to some embodiments. As shown in FIG. 1, the system 100 includes a compressed-data search engine 120, which includes a processor 121 in communication with a memory 122 and a transceiver 116 for wireless and/or wireless communication (e.g., via a wireless network N), optionally with a remote user compute device 110 and/or a remote machine learning platform 124. The compressed-data search engine 120 optionally includes a user interface 118 (e.g., a graphical user interface (GUI)) through which a user U can input a search term or other search criteria (as data input 112), and through which a user can view search results 114 that are generated by the compressed-data search engine 120 in response to the search term provided by the user. The memory 122 can store search string(s) 122A, which may include historical searches previously performed by the compressed data search engine 120. The memory 122 also can also store one or more hash tables 122B associated with one or more compressed data files of a file system of the system 100, a hash encoder 122C (also referred to herein as a "stealth encoder") for encoding/compressing raw data into compressed data files using at least one of the hash table(s) 122B, a hash decoder 122D for performing decompression of compressed data files, a compression/decompression (CODEC) module 122E (e.g., a software module that can compress and decompress tiles using any other data compression/decompression technique apart from hash encoding/decoding), the compressed data file(s) 122F of the file system, and/or search results 122G (which can include confirmed/validated search results and/or candidate search results, discussed further below). Alternatively or in addition, compressed data tiles 122F can be remotely stored and accessible by the compressed data search engine 120 (e.g., via the network N). The memory 122 also stores instructions 122H, executable by the processor 121 to perform steps, such as those set forth in the discussion of FIG. 2A below. The compressed-data search engine 120 can receive data input 112 (e.g., a search string including a pattern, such as a keyword) from the remote user compute device 110 and/or can send search result(s) 114 to the remote user compute device 110, for example wirelessly via network N. Alternatively or in addition, the compressed-data search engine 120 can receive data input 112 (e.g., a search string including a pattern, such as a keyword) from the user U via the user interface 118 and/or can provide/display search result(s) 114 to the user U via the user interface 118. The search result(s) 114 can be generated by the compressed-data search engine 120, according to instructions 122H, in response to the data input 112. In some embodiments, the search result(s) can be further refined using a machine learning model of the machine learning platform 124 and/or can be sent to the machine learning platform 124 as training data for training of a machine learning model of the machine learning platform 124.

Figure 2A:
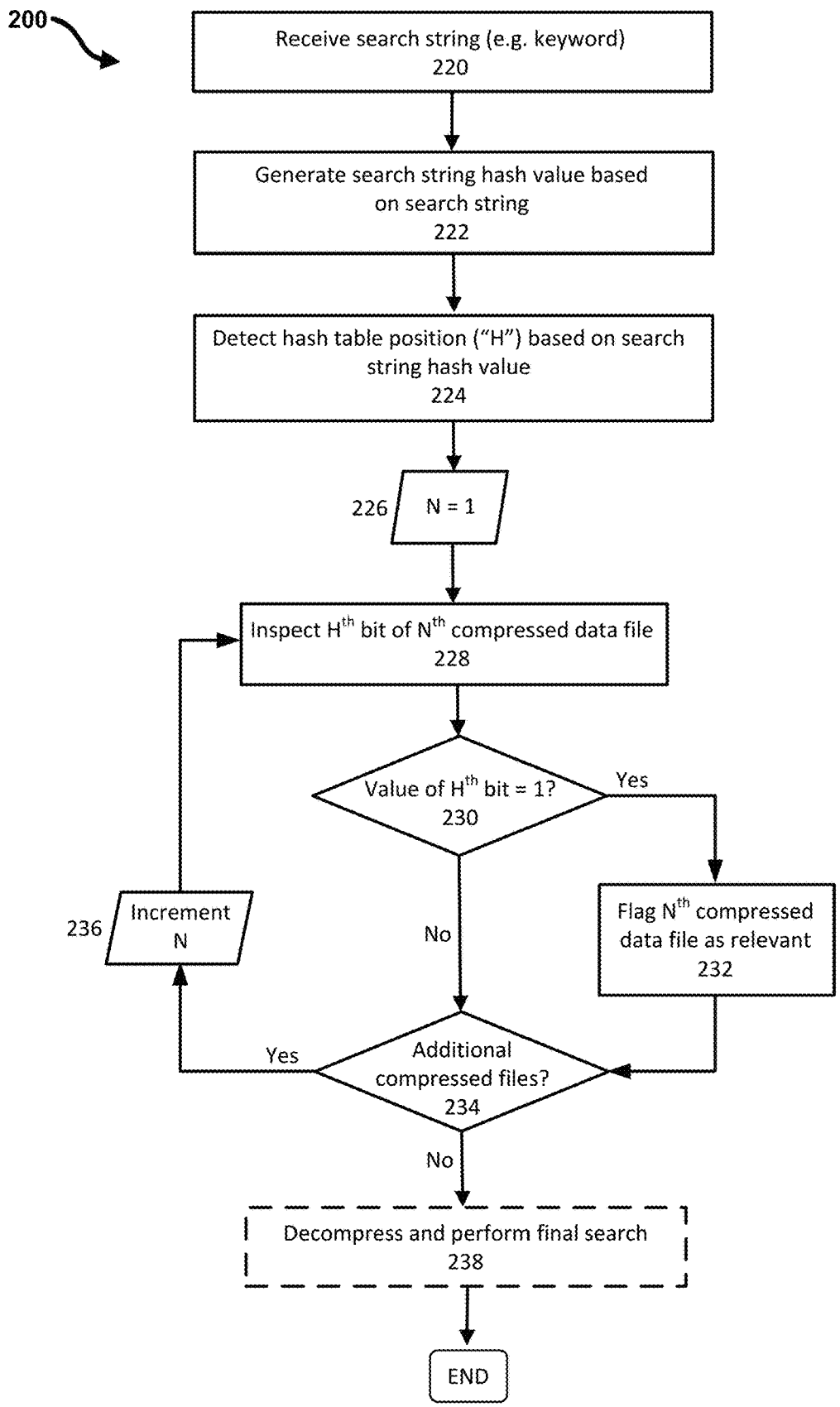
FIG. 2A is a flow diagram showing a method for performing a pattern-based search of a file directory, according to some embodiments.

FIG. 2A is a flow diagram showing a method for performing a pattern-based search of (or referencing) a file directory (or repository, or any other file storage structure) including compressed data files (compressed, for example, using a hash table algorithm), according to some embodiments. As shown in FIG. 2A, the method 200 begins with the receipt, at 220, of a search string (e.g., a pattern, such as a keyword), for example from a remote compute device (e.g., user compute device 110 of FIG. 1) or from a user via a GUI of a compressed-data search engine (e.g., compressed-data search engine 120 of FIG. 1). At 222, a search string hash value is generated based on the search string, by hashing the search string. At 224, one or more hash table positons "H"

are detected/determined based on the generated search string hash value. Subsequently, beginning with N=1 (226), compressed data files from a set of compressed data files (i.e., a file system) are inspected as follows. At 228, the $H^{th}$ bit of the $1^{st}$ compressed data file is inspected. If it is determined, at 230, that the value stored in the $H^{th}$ bit position of the $1^{st}$ compressed data file is "1," the $1^{st}$ compressed data file is flagged, at 232, as relevant to the pattern-based search. In other words, a "match" has been detected between the hash table position H and the $H^{th}$ bit position of the compressed data file, indicating that a statistically significant likelihood exists that the $1^{st}$ compressed data file contains the pattern as part of its contents. The method then proceeds to step 234. If, on the other hand, it is determined, at 230, that the value stored in the $H^{th}$ bit position of the $1^{st}$ compressed data file is not a "1" (e.g., is a "0"), no flagging of the $1^{st}$ compressed data file occurs, and the method proceeds to step 234. At 234, the system (e.g., the compressed data search engine 120 of FIG. 1) determines/checks whether any additional compressed data files exist within the specified directory. If no additional compressed data files exist, an optional decompression and final search (shown in greater detail in FIG. 2B) is performed on the compressed data files that have been flagged as relevant at 232, and then the method 200 ends. If additional compressed data files do exist, the value of N is incremented at 236, and the method 200 loops back to step 228 with an inspection of the $H^{th}$ bit of the $N^{th}$ compressed data file.

Figure 2B:
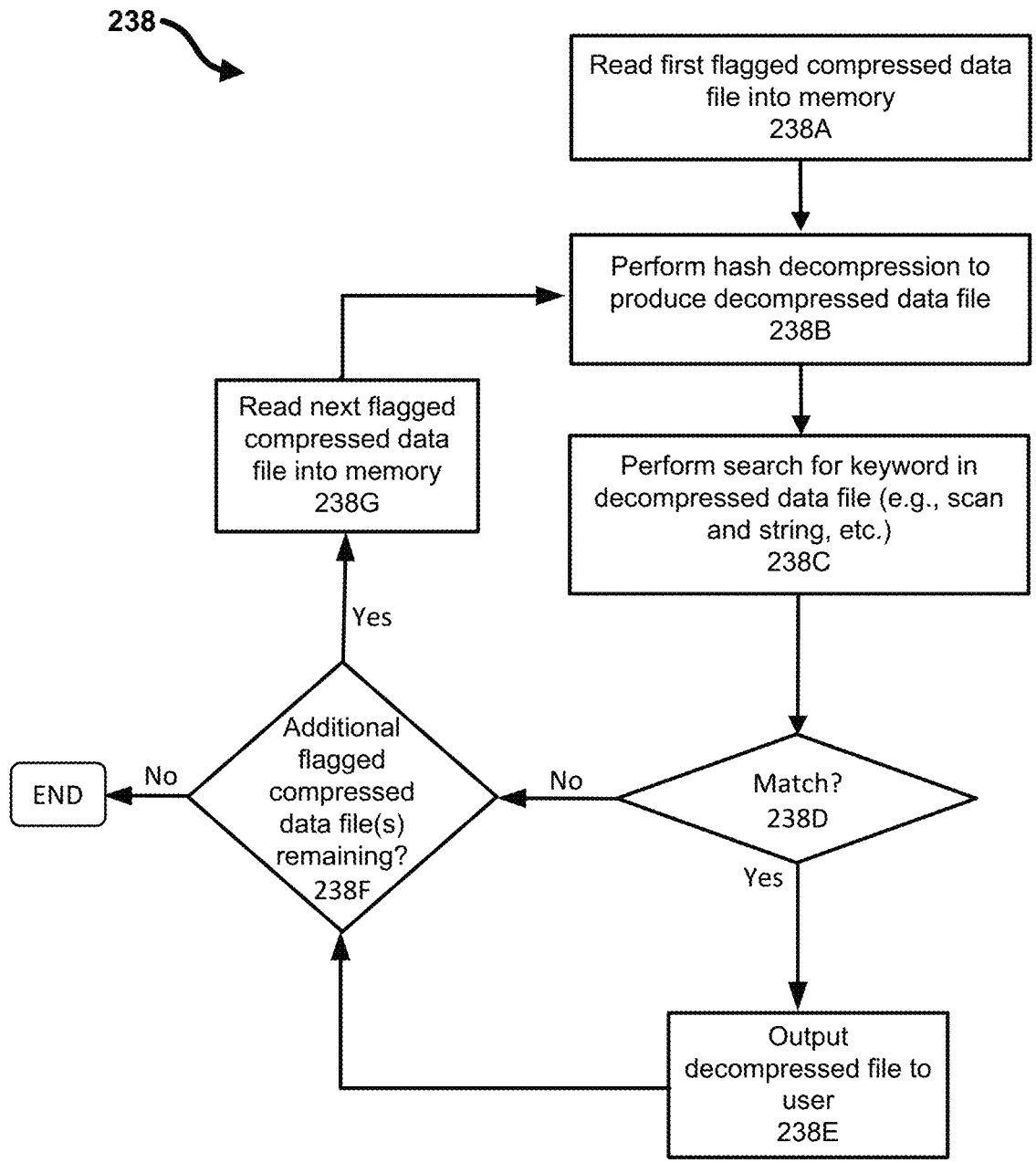
FIG. 2B is a flow diagram showing a decompression and/or final search step of the method of FIG. 2A.

FIG. 2B is a flow diagram showing details of the optional decompression and final search process 238 of the method 200 of FIG. 2A. As shown in FIG. 2B, a first flagged compressed data file (i.e., flagged as relevant at step 232 of FIG. 2A) is read into memory at 238A, and hash decompression is performed on the flagged compressed data file at 238B. A "final" search step, during which a search of the decompressed data file based on the original search string (e.g., a pattern, such as a keyword) is performed at 238C, for example using scan and string or any other known search technique. At 238D, a determination is made as to whether a match has been identified as a result of the search at 238C. If it is determined at 238D that a match has occurred, the decompressed data file can be output (e.g., transmitted/sent and/or displayed via a GUI) to a user (e.g., the user who initiated the pattern search) at 238E, and a check can then be performed, at 238F, to detect whether any additional flagged compressed data files remain. If it is determined at 238D that a match has not occurred as a result of the search at 238C, the process 238 proceeds to 238F. If, at 238F, it is determined that no additional flagged compressed data tiles remain, the process 238 ends. If, at 238F, it is determined that additional flagged compressed data files remain, a next flagged compressed data file is read into memory at 238G, and the process 238 loops back to the has decompression step of 238B and proceeds as outlined above.

In some embodiments, compression of initial raw data to form a compressed data file includes sequentially hashing sequences of X bytes (e.g., 4 or 6 bytes) into Y-byte hash values (e.g., 2 bytes) that are stored in, and that can be retrieved from, a hash table (e.g., locally stored in memory). The hash table, once generated/populated, thus holds hash values equal to or mappable to the position of the data (of the initial raw data) from which that hash was generated. Subsequently, when a pattern (or search term) is received (e.g., via a user interface, such as a graphical user interface (GUI), of a compressed-data search engine), the pattern can be hashed into a pattern hash value (e.g., at step 222 of method 200). The pattern hash value can be analyzed using the populated hash table by traversing the values of the populated hash table (also referred to herein as "hash values"), in a true/false or Boolean fashion (i.e., case-by-case or reference-by-reference) to determine one or more matching values (e.g., at step 224 of method 200). If there are, for example, 65,536 values within the hash table, a "1" value can be assigned to each "true" or "match" condition, and a "0" value can be assigned to each "false" or "no match" condition, resulting in a total of 65,536 bits (64 kilobits) that can be packed into 8 kilobytes. Each "1" value is associated with a matched hash table position (denoted as "H" in step 224 of FIG. 2A). In other words, there can be multiple matched hash table positions "H" (i.e., $H_1$ through $H_x$).

To illustrate, suppose that a user of the compressed data search engine wishes to identify all data files, within a file directory containing 50,000 compressed data files, that include the pattern (in this case, a keyword) "gravity." The pattern "gravity" can be hashed into a fixed length (e.g., 2 bytes) pattern hash value that is "unique" to or that matches that pattern string. Suppose the pattern hash value for the pattern "gravity" is 1,000. In other words, "gravity" is hashed into the $1,000^{th}$ position in the hash table. Then, for each of the 50,000 compressed data files, the $1,000^{th}$ bit is checked (e.g., without checking any other bits of the compressed data files). If "gravity" is included within, or is statistically significantly likely to be within, that compressed data file, the $1,000^{th}$ bit of that compressed data file will be a "1." "gravity" is not included within that compressed data file, the $1,000^{th}$ bit of that compressed data file will be a "0." One, a subset, or all of the analyzed compressed data files having a value of "1" as its $1,000^{th}$ bit can then be flagged or identified as a potential or actual match. In some embodiments, the flagged results are provided to the user (e.g., by sending a signal representing the flagged results to a GUI for display). In other embodiments, the flagged results are further analyzed (e.g., to detect and/or remove false positives, if any), prior to providing the flagged results to the user. The further analysis can include, for example, decompressing the flagged compressed data file(s) and performing a final search to confirm that the pattern is present in the flagged compressed data file(s). Additionally, the further analysis can consist of partially decompressing the flagged compressed data file(s) until the pattern is confirmed to be present, and stopping the process of decompression upon confirmation.

To further prevent the occurrence of false positives, multi-hashing can be performed. In a first example implementation of a multi-hashing approach, more than one search pattern can be used. For example, if two patterns (e.g., keywords) are used, both can be hashed using the same function, producing two hash table positions to be checked. If either of these positions is "0", the overall search will return a negative result. Such approaches can achieve a greater degree of accuracy, for example since checking a single hash table bit can yield a ~50% chance of a positive result (i.e., "1"), whereas checking two hash table bits can yield a ~25% chance of positive result (i.e., "1" and "1"). In a second example implementation of a multi-hashing approach, multiple hash table bits are checked, but in a different manner. For example, for a scenario in which a search pattern (e.g., "government") has a length that exceeds a minimum hash length (e.g. 6 bytes), multiple overlapping hash values can be produced. In this example, using 6-byte hashing inputs, each of "govern", "overnm", "vernme", "ernmen", and "rnment" would be hashed, producing 5 distinct hash values, and triggering a check of 5 hash table bits. Such an approach can effectively reduce the probability of a positive result (i.e., 5 instances of "1") to 3.125%, and thus can be implemented to reduce the chance of a false positive result to negligible levels.

Figure 3A:
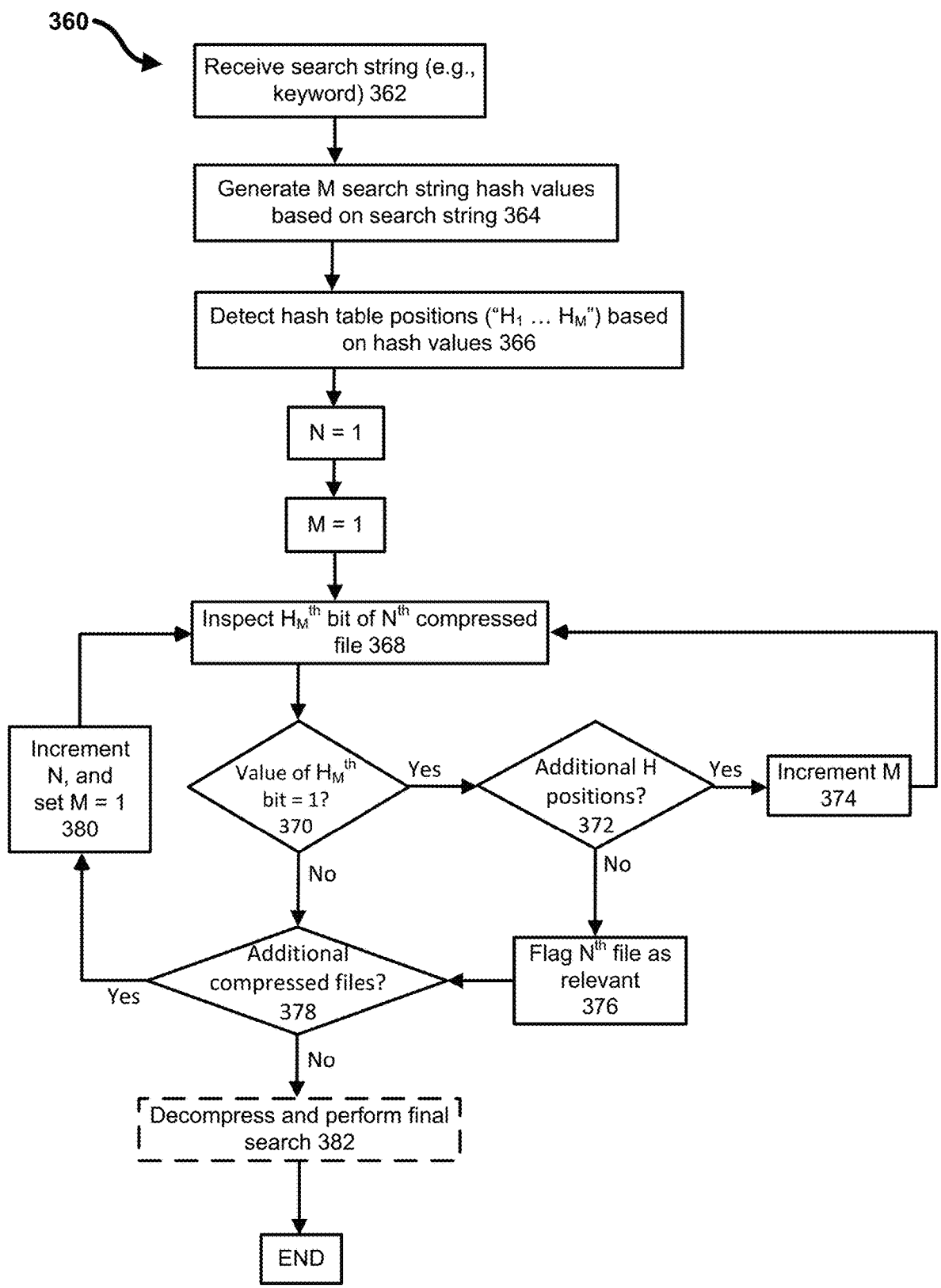
FIG. 3A is a flow diagram showing a method for performing a multi-hash search of a compressed file, according to some embodiments.

FIG. 3A is a flow diagram showing a method for performing a multi-hash search of one or multiple compressed files (the quantity for which is represented within FIG. 3A as "N"), according to some embodiments. As shown in FIG. 3A, the method 360 begins with the receipt of a search string (e.g., a pattern, such as a keyword) at 362. Multiple (the quantity for which is represented within FIG. 3A as "M") search string hash values are then generated, at 364, based on the search string. Hash table positions $H_1$ through $H_M$ are detected based on the hash values, at 366. Subsequently, counters for values of M and N are set to 1, such that the subsequent steps accomplish the sequential inspection of all hash table positions for all compressed files. At 368, the $H_M{}^{th}$ bit of the $N^{th}$ compressed file (the $H_1{}^{st}$ bit of the $1^{st}$ compressed file, in the first instance) is inspected. At 370, a determination is made as to whether the value of the $H_M{}^{th}$ bit is equal to 1. If the value of the $H_M{}^{th}$ bit is equal to 1, a determination is made at 372 as to whether additional H positions exist for the compressed file under consideration (i.e., the $N^{th}$ compressed file). If no additional H positions exist for the $N^{th}$ compressed file, the $N^{th}$ compressed file is flagged, at 376, as relevant, and the method 360 proceeds to a determination, at 378, of whether additional compressed tiles exist. If additional H positions do exist for the $N^{th}$ compressed file, the value of "M" is incremented at 374, and the method 360 loops back to step 368 for the inspection of the next $H_M{}^{th}$ bit (i.e., the $H_{M-1}{}^{th}$ bit). If, at 370, it is determined that the value of the $H_M{}^{th}$ bit is not equal to 1 (e.g., is equal to 0), a determination is made at 372 as to whether additional compressed files exist. If, at 378, it is determined that additional compressed files do exist, the value of "N" is incremented and the value of "M" is reset to 1, at 380, and the method 360 loops back to step 368 for the inspection of the $H_M{}^{th}$ bit of the next compressed file (corresponding to the incremented value of N). If, at 378, it is determined that no additional compressed files exist, decompression and/or final search of the search results are optionally performed at 382, and the method 360 ends.

FIG. 3B is a diagram illustrating an example generation of multiple overlapping hashes of a pattern, implementable for example at step 364 of FIG. 3A, according to some embodiments. As shown in FIG. 3B, multiple distinct hashes, which overlap in their contents, can be generated based on a pattern "abcdefghijkl." Although FIG. 3B shows seven hashes generated based on the pattern, other numbers/quantities of patterns (e.g., fewer than 7, such as 2, 3, 4, 5, or 6, or more than 7, such as 8, 9, 10, or more than 10) can alternatively be generated.

In some embodiments, further processing can be performed on the compressed data without degrading the performance of the searching methodology. An example scenario is in the use of encryption. For instance, for a compressed file that is encrypted, if the associated compression statistics are separately encrypted and maintained, the compression statistics remain accessible/usable for search purposes. For example, separately-encrypted compressed data statistics could be independently/separately decrypted and checked as part of the searching process. In the event that a positive result is returned, the remainder of the compressed data file may be decrypted for further searching. This can improve not only the performance of searching (e.g., since only a small amount of data is initially decrypted), but also the safety and security of data within such a system since a reduced amount of data is exposed in an unencrypted, vulnerable state. Known encryption techniques that could be applied to a compressed file, and separately to the compressed data statistics associated with the compressed file, include, but are not limited to: symmetric-key encryption, such as the Advanced Encryption Standard (AES), public-key encryption (e.g., RSA® cryptography), block cipher encryption (e.g., the Triple Data Encryption Standard (3DES), Twofish), etc.

Hash Table Compression/Encoding

In some embodiments, raw files determined to have a large size are compressed using a hash table algorithm. During hash table compression, redundancy can be removed from binary data (e.g., the raw files), which may be in the form of a received data stream, by parsing a predetermined number of bytes from the stream of binary data, and assigning hash table codewords (or hash values) to segments extracted from the binary data. A hash table encoder (e.g., hash encoder 122C) compresses data by assigning fixed length codewords to one or more bytes of the input (binary segment) data, which can of a variable or varying length, and long sequences of bytes of the binary data are replaced with hash values, where each hash value is shorter than the length of the associated byte sequence. The fixed length codeword positions are stored in one or more hash tables (e.g., hash table(s) 122B of FIG. 1), and the output of the hash table encoder (i.e., the generated compressed data file(s) 122F) can be saved in memory (e.g., memory 122) and/or transmitted via wired or wireless network transmission.

Figure 4:
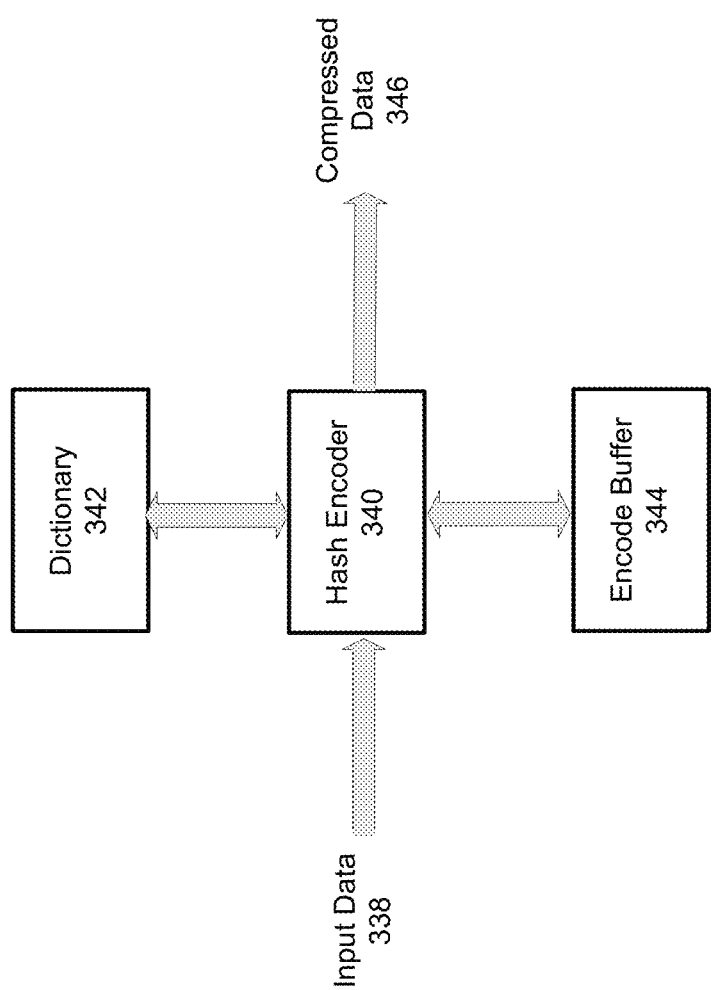
FIG. 4 is a flow diagram illustrating a hash encoder, according to some embodiments.

FIG. 4 is a flow diagram illustrating a hash encoder (configurable, for example, to execute a hash algorithm), according to some embodiments. As shown in FIG. 4, a stream of bytes (input data 338) is transmitted to, and received at, the hash encoder 340. The hash encoder 340 (or "hash table encoder") "grabs" (extracts/isolates) M bytes (e.g., four bytes in this embodiment, but could be more or less than M), generates a hash value for the M bytes (e.g., in consultation with the dictionary 342 storing pre-defined hash values), the hash value corresponding, to the position of the M bytes in the encode buffer 344 and/or in a decode buffer (described below with reference to 5).

The hash value is then encoded and stored in a new codeword along with the length: M. The selected bytes are also stored in the encode buffer 344 and/or in the decode buffer.

TABLE 1

Hash Encoder Codeword Format

| Prefix Code | Length | Hash Value |
|---|---|---|
| 1 bit | 4 bits | 16 bits |

Hash Codeword

As shown in Table 1, the first bit of the codeword may indicate that the hash table algorithm is being used for this codeword. The next 4 bits of the codeword indicate the length of a data segment being encoded/compressed, and the subsequent 16 bits represent the hash value of the encoded/compressed data segment. The location within the hash table of the 16 bits representing the hash value of the encoded/compressed data segment corresponds to "H" at step 224 of FIG. 2A). An example hash function is as follows:

hash=(U16)(((src)*HASH32)>>16)

where HASH32=2654435761 (or another 4-byte prime number)

and src=4 bytes to be encoded

In some embodiments, the hash value becomes the key for the hash table (e.g., hash table 122B of FIG. 1). The hash value retrieved from the hash table is the position of the original data segment from the beginning of the decoder buffer. The original data segment can be stored in an uncompressed format at this position within the decoder buffer.

Optimizing the Hash Code Word

In some embodiments, hash table matches occur in a pattern, with some occurring more frequently than others. Greater compression ratios can be achieved by assigning smaller hash values to the more frequently-occurring matches, and by assigning larger hash values to the less frequently-occurring matches.

In some embodiments, the use of weighted frequencies in the hash table encoder yields a codeword having the format defined by Table 2:

TABLE 2

Hash Encoder Weighted Codeword Format

| Prefix Code | Length | Hash Length | Hash Value |
|---|---|---|---|
| 1 bit | 4 bits | 4 bits | 1-15 bits |

The weighted format of Table 2 results in codeword lengths varying between 10 and 24 bits, as opposed to 21 bits with the unweighted format of Table 1. Since the most frequently-occurring hash values are the smaller ones, the overall compression ratio increases.

Hash Table Based Encoding

Figure 5:
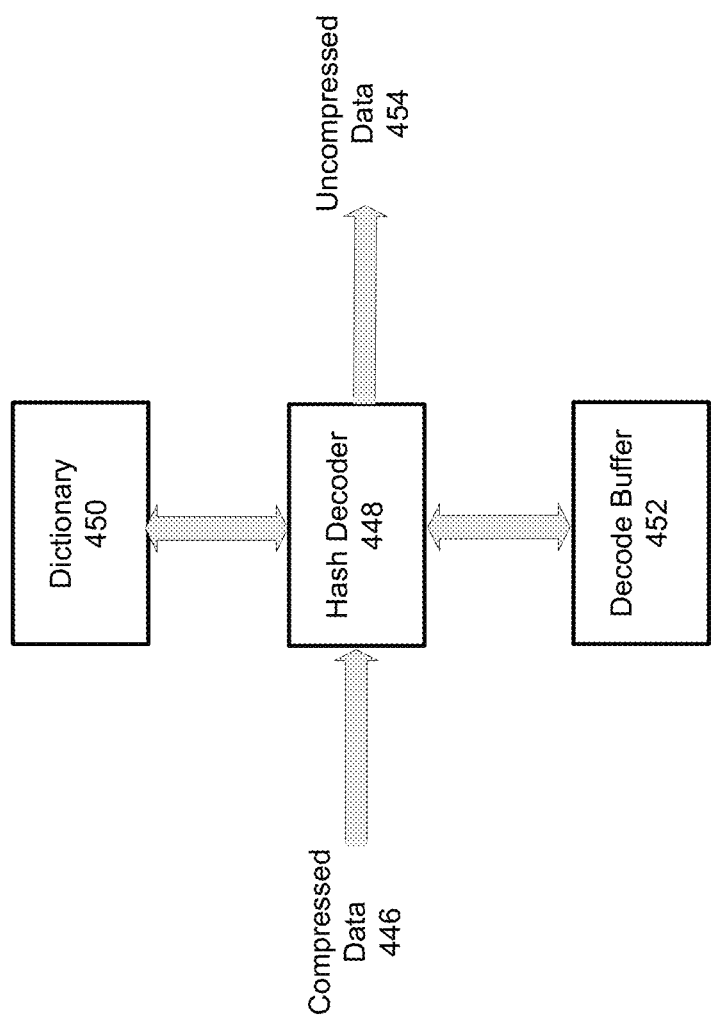
FIG. 5 is a flow diagram illustrating a hash decoder, according to some embodiments.

In some embodiments, a hash encoding process for an uncompressed (i.e., pre-compression), raw input data file includes:
(1) Receive or retrieve bytes (e.g., 4-8 bytes) from the input data file
(2) Generate a hash value based on the bytes
(3) Query the hash table based on the hash value
(4) if the hash value is returned/found:
　(a) Check for more matching bytes beyond the initial four bytes
　(b) If more matching bytes are found:
　　(i) Increase the length by the number of new matching bytes: P
　　(ii) Append the four+P bytes to the decode buffer
　　(iii) Update the position for the hash key, and overwrite the position in the hash table
　　(iv) Save/store and/or transmit the codeword with the updated length
　(c) If more matching bytes are not found:
　　(i) Append the bytes to the decode buffer
　　(ii) Update the position for the hash key, and overwrite the position in the hash table
　　(iv) Save/store and/or transmit the codeword
(5) If the hash value is not returned/found:
　(a) Encode the first byte of the four bytes using the VLC method
　(b) Append the byte to the decode buffer Hash Table Decoder/Decompression Algorithm A flow diagram illustrating a hash decoder, compatible with the hash encoder of Table 2, according to some embodiments, is provided in FIG. 5. As shown in FIG. 5, the hash decoder 448 (e.g., hash decoder 122D of FIG. 1) receives compressed data 446. The hash decoder 448 can determine/detect (e.g., from the first bit of the received compressed data 446) that the compressed data 446 is a hash table encoded bitstream (e.g., if the first bit is equal to 1). The hash decoder 448 also reads and saves the next 4 bits of the compressed data 446. These 4 bits represent the length of the data segment to be decoded. Another 4 bits are then read, these further 4 bits representing the length of the hash value. Finally, based on the value of the previous 4 bits, a number of bits (between 1 and 15) associated with the length of the hash value are read. These 1-15 bits represent the hash value that points to the position of the data segment to be extracted from the decoder buffer. The hash key can then be applied to a hash table (e.g., dictionary 450). The value obtained from dictionary 450 is the position into the decode buffer 452 which, along with the previously decoded length, is used to locate the indicated bytes from the decode buffer 452 and output them (e.g., transmitting and/or saving the decoded data) as uncompressed data 454.

Figure 6:
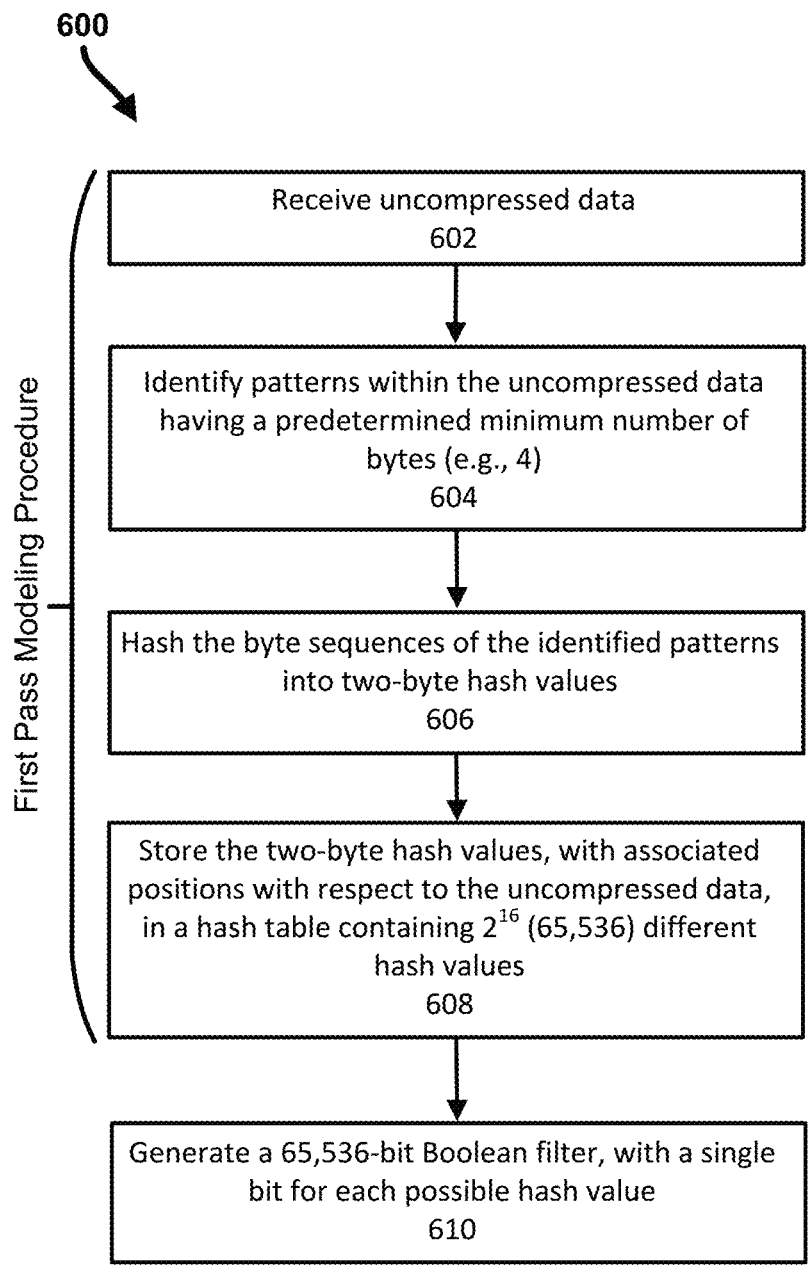
FIG. 6 is a flow diagram illustrating generation of a stealth hash filter, according to some embodiments.

In some embodiments, a hash table decoding process includes:
(1) Receive compressed data
(2) Determine, based on a first bit of the compressed data, whether the bitstream is hash table encoded
(3) If the bitstream is hash table encoded
　(a) Read and save the next 4 bits, which represent the length of the to-be-decoded data segment
　(b) Read another 4 bits, which represent the hash key size
　(c) Read another 1-15 bits, depending upon the hash key size, and query the hash table based on the 1-15 further bits
　(d) In response to the query, receive the position value
　(e) Locate, within the decoder buffer and based on the position value and the length, the decoded data segment
　(f) Output (e.g., save/store and/or transmit) the decoded data segment Stealth Hash Filter Creation In some embodiments, the compression of uncompressed data includes a first pass modeling procedure and a second pass modeling procedure. A goal of a first pass modeling procedure is to map uncompressed data to identify similar sequences/patterns of a minimum number of bytes (e.g., four bytes) and generate hashes based on the sequences/patterns. A goal of a second pass modeling procedure is to use the hashes generated during the first pass modeling procedure to parse repetitions, for example using a lossless data compression algorithm such as LZ77 or LZ78. FIG. 6 is a flow diagram illustrating a method of generating a stealth hash filter, including a first pass modeling procedure, according to some embodiments. The method 600 of FIG. 6 can be performed, for example, using a compressed data search engine, such as compressed data search engine 120 of FIG. 1. As shown in FIG. 6, the method 600 begins with receiving uncompressed data (e.g., an uncompressed data file or multiple uncompressed data files), at 602, and identifying patterns (i.e., byte sequences) within the uncompressed data, at 604, having a predetermined minimum number of bytes (e.g., four bytes). At 606, the patterns (or byte sequences) are hashed into two-byte hash values (e.g., as a single two-byte hash value for each pattern/byte sequence). At 608, the two-byte (16-bit) hash values are stored in a hash table containing 65,536 ($2^{16}$) different hash values. Each two-byte hash value can be stored in a record of the hash table together with an associated position with respect to the uncompressed data. The positions can be positions within the input buffer. The input buffer can have size, for example ranging from a few (e.g., 3-5) bytes to several gigabytes. Each position has a size, for example, of 4 bytes or 8 bytes. The hash values (i.e., the hashed sequences) may overlap one another, selected via a second pass modeling procedure, for example as shown in FIG. 7 for a keyword. In the example of FIG. 7, the 10 bytes ("a" through "j") of the example uncompressed data (in this case, a keyword) are represented by seven different, overlapping four-byte sequences. The number of overlapping sequences can be calculated as follows: (file length–(minimum match size–1)). In the example of FIG. 7, the length of the keyword is 10, and the minimum match size is 4, so there are 7 overlapping sequences (10–(4–1)). At the end of the first pass modeling procedure of FIG. 6, the hash table contains the last positions (i.e., the most recently-occurring and/or the last in order of appearance within the uncompressed data) of every hash value appearance in the input uncompressed data file, meaning that any hash values not associated with a position did not appear in the uncompressed data. At 610, a 65,536-bit (8 KB) Boolean filter is generated, based on the hash table, with one bit for every possible hash value. For example, bit number 25,878 in the Boolean filter can represent the hash value 25,878. The Boolean filter can subsequently be used to perform searches of the compressed version of the uncompressed data and/or other compressed data.

In some embodiments, a bit within each record of a hash table is set to '1' if that record (referencing a particular hash value) contains or is associated with/linked to a position, and set to '0' if that record does not contain, or is not associated with/linked, to any position (e.g., as part of step 608 in FIG. 6). The generation of the Boolean filter based on the hash table can include steps similar to those used in the creation of a Bloom filter, but differs from the creation of a Bloom filter at least in the way that the data is hashed. For example, the size of the sequences hashed in the method 600 of FIG. 6 is not based on the lengths of words, but rather on a minimum match size used by a second pass modeling procedure (e.g., four bytes), as shown and described with reference to FIG. 7, thereby facilitating substring search and increased search result accuracy.

Searching with the Flash Filter

In some embodiments, a stealth search method reduces or prevents unnecessary data decryption and/or decompression by subdividing data into chunks of pre-defined sizes and, during execution of a search, using a Boolean filter to trigger/flag only the chunks that have a potential pattern match. The chunks that are not triggered/flagged remain encoded, which saves time and adds security. When performing a search, in the stealth search mode, a desired pattern or keyword (received, e.g., from a compute device of a user in response to the user's interaction with a user interface of the compute device) can first be hashed in the same manner as would have been used in the compression of that pattern or keyword. For example, a keyword can be hashed using overlapped hashes of a minimum match size used during compression of the file. The hashes are then converted in bit positions based on the technique used to store the Boolean filter. Because the hashes are overlapped, several positions within the Boolean filter are checked/evaluated for a single keyword of interest. While a Bloom filter checks only one bit per hash function, the stealth search method checks; "keyword length"–(minimum match size–1) bits. To ensure that the stealth search method prevents any false negatives, during searches performed using the Boolean filter, chunks of data are only triggered/flagged if one of the bits that are checked is "true" (or has a value of "1")—otherwise, the chunk remains encoded.

Storage and Storage Reduction Techniques

In some embodiments, a size of the Boolean filter can be automatically adapted based on a chunk size desired by the user, for example maintaining a predefined ratio of 1:8 (filter:uncompressed chunk size). A user can specify a level of filter compression, from multiple available levels of filter compression (e.g., three levels—small, medium and large), in some implementations, the compression applied impacts the usage of the Boolean filter (e.g., by increasing or decreasing a probably of hash collisions, where a hash collision is defined as an undesirable situation in which two distinct pieces of data have the same hash value).

In some embodiments, to reduce a storage size of a filter (e.g., a Boolean filter), several hash values may be addressed to the same bit. For example, to reduce the size of the filter by two, one bit can be used to represent two hash values. Stated more generally, to reduce the size of the filter by a factor of "X," one bit can be used to represent "X" hash values. The Boolean value for a given bit of the hash filter can then be determined by the "OR" of all the hash values that the bit represents. For example, if "X"=2, two hash values are represented by one hash filter position, using an "OR" operation. If the two hash values are "1" and "1," the Boolean value for the hash filter bit will be "1," while hash values of "0" and "0" will produce a Boolean value for the hash filter bit of "0." If, however, the hash values are "1" and "0," the Boolean value for the hash filter bit will remain "1." In other words, a hash value of "1" cannot result in a Boolean value for the hash filter bit of "0" (i.e., a "true" value cannot become false). However, in the same example, since the hash value of "1" and the hash value of "0" produce a Boolean value for the hash filter bit of "1," the Boolean value for the hash filter bit was "1" despite one of the hash values being "0" (i.e., a "false" value became true; a false positive). In other words, a false can become true but a true can't become false. Should such an approach undesirably increase the number of false positives, such an outcome can be mitigated or reversed by expanding the hash filter (i.e., reducing the number of hash values represented by a single bit). In other words, a hash filter optimization can be performed as follows: given a hash table in which a first quantity of hash values are addressed to a single bit "X," regenerating the hash value such that (1) a first subset of hash values from the first quantity of hash values remains addressed to the single bit X, the first subset of hash values having a second quantity of hash values less than the first quantity of hash values, and (2) at least one further subset of hash values from the first quantity of hash values is addressed to at least one further bit, each subset of hash values from the at least one further subset of hash values having a third quantity of hash values less than the first quantity of hash values.

In some embodiments, the Boolean filter is stored together with (e.g., co-located with) the compressed and/or encrypted data, in which case the Boolean filter may be appended to each data chunk. In other embodiments, the Boolean filter is stored in a separate file, where it can be read by the search tool. The Boolean filter is optionally encrypted (e.g., for security purposes), in which case the search tool can decrypt (and read) the Boolean filter without decrypting the data chunks during the stealth search method. In the latter case, since the Boolean filter is decrypted without decrypting the data chunks, the search process can be performed faster on a hard drive, by reducing the random memory access.

Searchable Compression

Given a number of files that have been encoded by a hash encoder of the present disclosure, one may desire to know if one or more of the encoded files contains a particular phrase. As discussed above, using some known techniques, this would involve decoding the file(s) and searching for the given phrase, e.g., using a tool/utility such as grep. A command to search for a phrase in a decoded file may appear as follows:

Grep Search-Phrase Filename

Grep displays all lines in the file containing the search-phrase with the search-phrase highlighted. The results of the search may appear, for example, as follows:

word1 word2 word3 search-phrase word4 word5 word6
word7 search-phrase word8 word9 word10
word11 word12 word13 word14 word15 word16 search-phrase By contrast, according to methods set forth herein, one can determine whether a compressed document contains a particular search-phrase without decoding the file, e.g., using the stealth search method or a system having the stealth search capability built-in, an example implementation of which is set forth below.

Example Stealth Hash Filter Implementation

In some embodiments, a stealth encoder leverages the fact that the stealth encoder (or hash encoder) pre-computes and stores hash values for phrases containing minimum-match-length or more characters in a hash table (e.g., a Boolean table, for example as shown and discussed with reference to FIG. 6 above). Once the populating of the hash table is complete, a function initialize_hash_filter( ) in a file "stealth search.c" can be called, for example implemented as follows:

```
initialize_hash_filter( ) in the file "stealth_search.c" is called:
  // Initialize hash filter for encoder
  void initialize_hash_filter(stealth_codec *stealth,
              uint32_t *hash_table,
              stealth_params_CMD *params_cmd) {
    for (uint32_t i = 0; i < NUM_64K; i++) {
      if (hash_table[i] != 0) {
        setbit(stealth->hash_filter,
            i, params_cmd->hash_filter_table_size_selector,
            params_cmd->print_duplicates);
      }
    }
  }
```

The initialize_hash_filter( ) function reads the hash table and populates a binary table (named hash_filter) with true (1) or false (0) based on the detected existence of, or lack of, respectively, a non-zero value in the hash table. The hash table can be included in the header of a compressed file.

If the stealth decoder is run with the option to search for a phrase, the stealth decoder can compute the hash value of the first minimum-match-length characters of the phrase, and check to determine whether or not the content at the address of the hash value in the hash table is true or false. The command to cause execution of this step can appear as follows:

stealth -s search-phrase file.st

The function that first performs the search in the filter is stealth_search_filter( ), in the file "stealth_search.c," for example implemented as follows:

```
/* stealth_search_filter: Is called to check the filter without decrypting/decomopressing
 * the chunk. Return 1 if we could have a match in the chunk, 0 if the keyword doesn't
 * happen at all */
STEALTH_LIBRARY bool stealth_search_filter(const uint8_t *buf_in,
        const uint8_t *keyword,
        const uint32_t keyword_length,
        uint16_t *fill) {
  uint8_t filter_option = NULL;
  // Check if the data is trustable
  if (!(filter_option = check_buffer_trust(buf_in, MAGIC_HF))) {
    printf("ERROR: file not supported\n");
    return false;
  }
  // Keyword too short to be process, we need to decompress
  if (keyword_length < MIN_MATCH_LENGTH_HM) {
    return true;
  }
  // Allocate hash_array
  uint16_t *wrk_buffer =
      stealth_malloc((keyword_length * sizeof(uint64_t)) + sizeof(uint64_t));
  // Hash the entire keyword
  hash_keyword(keyword, keyword_length, wrk_buffer);
  hashes_to_positions(wrk_buffer, keyword_length, filter_option);
  // Check the filter using the hash_array
  const uint8_t off = sizeof(uint16_t) + sizeof(uint8_t) + sizeof(*fill);
  memcpy(fill, buf_in + off - sizeof(*fill), sizeof(*fill));
  bool trigger = check_filter(wrk_buffer, (buf_in + off), keyword_length);
  // De-alloc the working buffer
  stealth_free(wrk_buffer);
  // return 1 if the chunk has been triggered 0 if not
  return trigger;
}
```

The function takes only the filter as input, while the rest of the data remains encrypted/compressed. First, the function hashes the phrase that is being sought, calling hash_keyword( ), then converts the hashes in filter positions with hashes_to_positions( ). Finally, every bit position is checked in the filter bit stream to confirm or not the possible presence of the keyword in the chunk with check_filter( ) which will isolate the bits in the bit stream. If all of the bits selected are "true," check_filter( ) will return "true," which means that the chunk has been triggered for a full decompression/decryption. Otherwise, "false" is returned, meaning that the phrase cannot be present and the chunk remains encrypted/compressed.

Since the hash table can include hash collisions, it is possible for the filter search function to produce false negatives. If a chunk has been triggered by stealth_search_filter and to avoid false negatives, the stealth search method can include search function. For example, the following function:

stealth_search_compressed( ), in the file
    stealth_search.c uses to look for the search-phrase. Here is the code:

To perform a search, the function first decompresses the data and outputs it to a buffer wrk_buffer. The data can then be searched by two methods: a) redirecting the output to enable a third party tool, such as grep, to perform a search of the phrase in the buffer, or b) performing one or more pattern-matching algorithms, such as Boyer-Moore, to rapidly find matching phrases in a bit stream.

Figure 8:
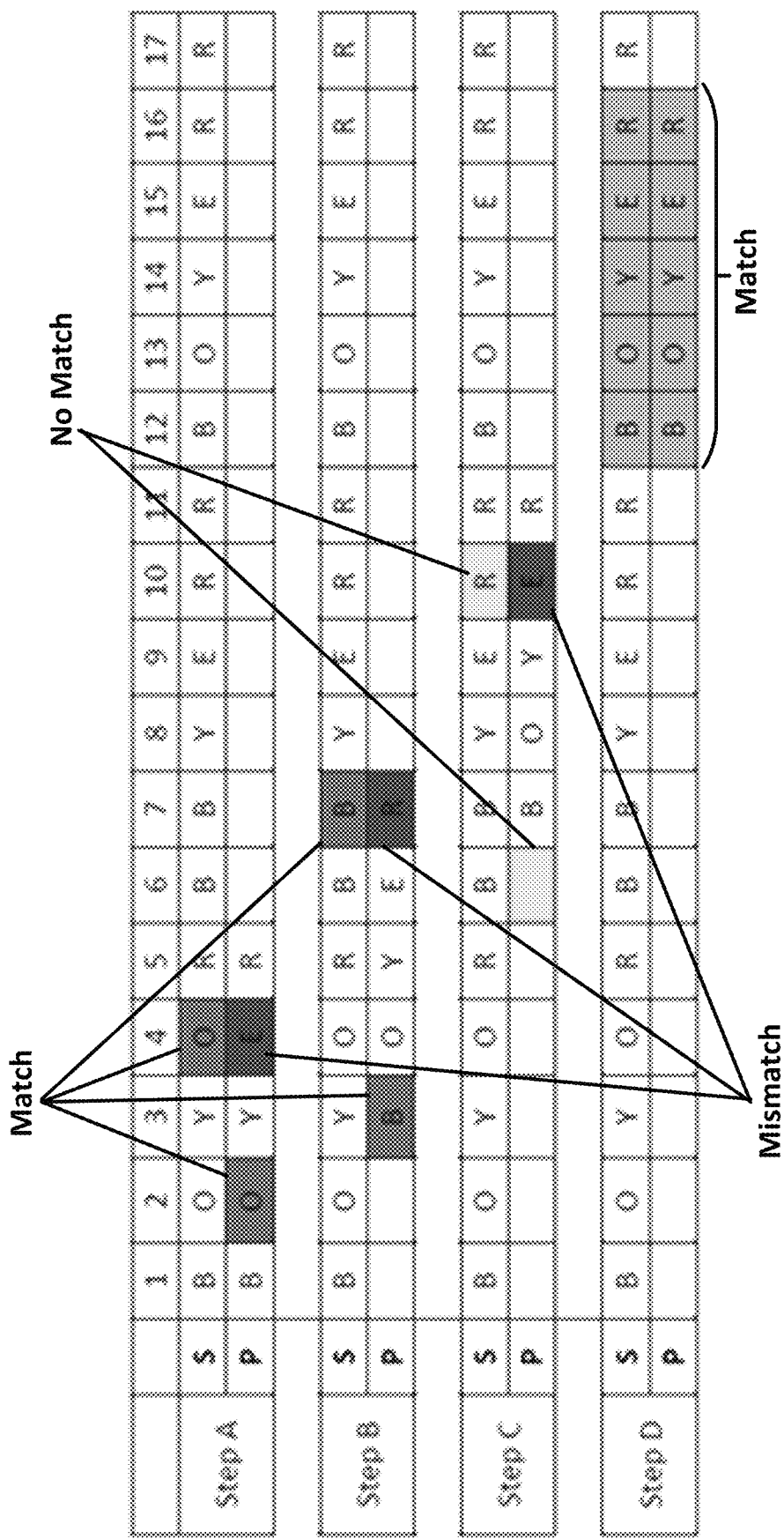
FIG. 8 is an example of a hash table used with the stealth search method, according to some embodiments.

FIG. 8 is an example of a hash table used with the stealth search method, illustrating a backwards search procedure, according to some embodiments. Referring to Step A of FIG. 8, a backwards search commences at column 5, searching for matches between a string "S" row and a pattern "P" row. A match is found in column 5, and then a mismatch is found in column 4 (where S="O" and P="E"). The backwards search continues within row P, searching for an 'O'. A match is found in column 2. In response to the match at column 2, the pattern of row P is shifted to the right until the 'O's are aligned. The backwards search continues at Step B, in column 7, where a mismatch ("B" in the S row and "R" in the P row) is identified. Continuing the backwards search for the letter 'B', a match is found in column 3 of row P. The pattern of row P is then shifted to the right until the 'B's align at column 7. The backwards search continues at Step C, at column 10, where a mismatch is found (S="R" and P="E"). In response to the mismatch, the word in row P is shifted to the right by the length of the word (5 characters). Finally, in Step D, the entire word in row P is found to match the word in row S (i.e., the pattern matches the string). This condition triggers an incrementing of a match counter. The pattern search can continue in a similar manner until the end of the document is reached, at which point the following output statement can be generated:

InBytes: 2048, OutBytes: 4096, CR: 2.0, HashMatchCnt: 3, TotalMatches: 6, Time: 6 ms The HashMatchCnt value indicates that the hash filter found a match, and that the match was 2 bytes longer than minimum-match-length. HashMatchCnt is the number of 4B hashes that were checked, with the minimum being 1 (4B), but in the above case, was 3 (6B, 1-4, 2-5 and 3-6). The value "CR" is a compression ratio (e.g., 4096:2048). The TotalMatches value indicates that the Boyer-Moore search found 6 occurrences of the search-word in the document.

Additional details regarding compression and decompression techniques can be found in U.S. patent application Ser. No. 16/250,345, titled "Systems and Methods for Variable Length Codeword Based, Hybrid Data Encoding and Decoding Using Dynamic Memory Allocation," the entire content of which is incorporated by reference herein in its entirety for all purposes.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:
1. A method, comprising:
receiving, at a processor, an uncompressed data file;
identifying, via the processor, a plurality of patterns of the uncompressed data file, each pattern from the plurality of patterns including a predetermined number of bytes;
hashing, via the processor, each pattern from the plurality of patterns into a hash value, to produce a plurality of hash values;
storing the plurality of hash values in a hash table, each record of a plurality of records of the hash table including a hash value from the plurality of hash values and an associated position value, to produce a compressed, encrypted data file associated with the uncompressed data file;
generating, via the processor, a Boolean filter based on the hash table, each bit from a plurality of bits of the Boolean filter associated with a different hash value from the plurality of hash values;
receiving, at the processor, a search request including a search string;
computing a search string hash value based on the search string;
when a position stored at a location within the Boolean filter, the location having an address equal to the search string hash value, is true:
flagging, via the processor, that at least a portion of the compressed data file is relevant to the search request.
2. The method of claim 1, wherein the predetermined number of bytes is 4 bytes.

3. The method of claim 1, wherein each hash value from the plurality hash values is a two-byte hash value from a plurality of two-byte hash values.

4. The method of claim 1, wherein computing the search string hash value includes computing overlapping hashes based on a minimum match size value.

5. The method of claim 1, wherein the plurality of bits of the Boolean filter includes 65,536 bits.

6. The method of claim 1, further comprising receiving, at the processor and from a compute device of a user, a signal representing the predetermined number of bytes prior to identifying the plurality of patterns.

7. The method of claim 1, wherein the predetermined number of bytes is based on a minimum match size value.

8. The method of claim 1, wherein the identifying the plurality of patterns of the uncompressed data file includes identifying overlapping patterns of the uncompressed data file.

9. A method, comprising:
receiving, at a processor, a search request including a search string;
generating, via the processor, a search string hash value based on the search string;
detecting, via the processor and based on the search string hash value, a hash table position of a hash table;
when a position of a bit of an Nth compressed data file, the bit having a value corresponding to the hash table position, is true:
flag the Nth compressed data file as relevant to the search request, and
transmit a signal representing the Nth compressed data file to a compute device of a requestor associated with the search request;
determine whether at least one additional compressed data file exists; and
when at least one additional compressed data file exists, inspecting the at least one additional compressed data file to determine whether the at least one additional compressed data file is relevant to the search request.

10. The method of claim 9, further comprising, in response to determining that the value of the bit is true, decompressing the Nth compressed data file to confirm that the Nth compressed data file is relevant to the search request.

11. The method of claim 9, further comprising:
reading the flagged Nth compressed data file into memory;
performing a hash decompression of the flagged Nth compressed data, to produce a decompressed data file; and
performing a search for the search string in the decompressed data file.

12. The method of claim 9, further comprising:
reading the flagged Nth compressed data file into memory;
performing a hash decompression of the flagged Nth compressed data, to produce a decompressed data file;
detecting a match between the search string and the decompressed data file based on a search for the search string in the decompressed data file; and
in response to detecting the match, outputting the decompressed file to the compute device of the requestor associated with the search request.

13. The method of claim 9, further comprising generating the hash table based on uncompressed data.

14. The method of claim 9, further comprising generating the hash table by:
identifying, via the processor, a plurality of patterns of uncompressed data;
hashing, via the processor, each pattern from the plurality of patterns into a hash value, to produce a plurality of hash values; and
storing the plurality of hash values in the hash table.

15. The method of claim 9, further comprising generating the hash table by:
identifying, via the processor, a plurality of patterns of uncompressed data, each pattern from the plurality of patterns including a predetermined number of bytes;
hashing, via the processor, each pattern from the plurality of patterns into a hash value, to produce a plurality of hash values; and
storing the plurality of hash values in the hash table, each record of a plurality of records of the hash table including a hash value from the plurality of hash values and an associated position value, to produce a plurality of compressed data files including the Nth compressed data file.

16. A system, comprising:
a processor; and
a processor-readable memory storing instructions that, when executed by the processor, cause the processor to:
receive an uncompressed data file;
identify a plurality of patterns of the uncompressed data file, each pattern from the plurality of patterns including a predetermined number of bytes;
hash each pattern from the plurality of patterns into a hash value, to produce a plurality of hash values;
store the plurality of hash values in a hash table, each record of a plurality of records of the hash table including a hash value from the plurality of hash values and an associated position value, to produce a compressed, encrypted data file associated with the uncompressed data file;
generate a Boolean filter based on the hash table, each bit from a plurality of bits of the Boolean filter associated with a different hash value from the plurality of hash values;
receive a search request including a search string;
compute a search string hash value based on the search string;
when a position stored at a location within the Boolean filter, the location having an address equal to the search string hash value, is true:
flag that at least a portion of the compressed data file is relevant to the search request.

17. The system of claim 16, wherein the identifying the plurality of patterns of the uncompressed data file includes identifying overlapping patterns of the uncompressed data file.

18. The system of claim 16, wherein each hash value from the plurality of hash values is a two-byte hash value from a plurality of two-byte hash values.

19. The system of claim 16, wherein the predetermined number of bytes is 4 bytes.

20. The system of claim 16, the memory further storing instructions that, when executed by the processor, cause the processor to receive, from a compute device of a user, a signal representing the predetermined number of bytes prior to identifying the plurality of patterns.

* * * * *

UNITED STATES PATENT AND TRADEMARK OFFICE
CERTIFICATE OF CORRECTION

PATENT NO. : 10,977,315 B2
APPLICATION NO. : 16/806338
DATED : April 13, 2021
INVENTOR(S) : Nicolas Thomas Mathieu Dupont et al.

Page 1 of 1

It is certified that error appears in the above-identified patent and that said Letters Patent is hereby corrected as shown below:

In the Specification

At Column 6, Line 26, "tiles" should instead read --files--
At Column 6, Line 32, "tiles" should instead read --files--
At Column 13, Line 36, "Flash" should instead read --Hash--

Signed and Sealed this
Sixth Day of July, 2021

Drew Hirshfeld
*Performing the Functions and Duties of the
Under Secretary of Commerce for Intellectual Property and
Director of the United States Patent and Trademark Office*